United States Patent [19]

DuHack

[11] Patent Number: 4,936,337
[45] Date of Patent: Jun. 26, 1990

[54] ARMATURE FOR A SOLENOID OPERATED VALVE

[75] Inventor: Michael R. DuHack, Lafayette, Ind.

[73] Assignee: Emhart Industries, Inc., Indianapolis, Ind.

[21] Appl. No.: 122,630

[22] Filed: Nov. 19, 1987

Related U.S. Application Data

[63] Continuation of Ser. No. 886,891, Jul. 18, 1986, abandoned.

[51] Int. Cl.⁵ .............................................. F16K 31/06
[52] U.S. Cl. ............................ 137/329.04; 251/129.15
[58] Field of Search ....................... 137/625.65, 625.64, 137/329.04; 251/129.15, 129.21

[56] References Cited

U.S. PATENT DOCUMENTS

| | | | |
|---|---|---|---|
| 3,013,768 | 12/1961 | La Mastra ....................... | 251/129.15 |
| 3,185,177 | 5/1965 | Brandenberg et al. .... | 251/129.21 X |
| 3,215,902 | 11/1965 | Foley et al. ................. | 251/129.15 X |
| 3,262,027 | 7/1966 | Zaleske et al. ............. | 251/129.15 X |
| 3,307,585 | 3/1967 | Schilling et al. ................ | 137/625.66 |
| 3,444,895 | 5/1969 | Schnittker ....................... | 137/625.65 |
| 3,550,632 | 12/1970 | Noakes et al. .................. | 137/625.65 |
| 3,768,517 | 10/1973 | Dauliukonis ..................... | 137/625.65 |
| 3,784,154 | 1/1974 | Ostrowski et al. . | |
| 3,872,878 | 3/1975 | Kotel et al. . | |
| 3,977,436 | 8/1976 | Larner ............................ | 137/625.65 |
| 4,174,824 | 11/1979 | Kolze . | |
| 4,175,590 | 11/1979 | Grandclement . | |
| 4,178,573 | 12/1979 | Swanson . | |
| 4,387,878 | 6/1983 | Zukausky . | |
| 4,558,844 | 12/1985 | Donahue, Jr. . | |

FOREIGN PATENT DOCUMENTS 889987  2/1962  United Kingdom ........... 137/625.65

*Primary Examiner*—Arnold Rosenthal
*Attorney, Agent, or Firm*—Carl A. Forest

[57] ABSTRACT

An armature for a solenoid operated valve in which a magnetically responsive tubular housing has a central aperture extending longitudinally therethrough. Secured within the aperture is a seal component with opposite ends positioned relative to the open ends of the housing so that either of the ends of the seal component are sealingly engageable with a valve seat. The tubular housing has either a split-seam construction or a seamless construction. Both ends of the sealing component extend outwardly beyond the ends of the tubular housing, and may include a disc-shaped portion at either or both ends.

12 Claims, 3 Drawing Sheets

ARMATURE FOR A SOLENOID OPERATED VALVE

This application is a continuation of application Ser. No. 886,891, filed July 18, 1986 now abandoned.

BACKGROUND OF THE INVENTION

1. Field of the Invention:

This invention relates to the field of solenoid operated valves and more particularly to an armature for a solenoid operated valve which has a seal component secured within a magnetically responsive tubular housing.

2. Description of the Prior Art:

Currently accepted designs of armatures for solenoid operated valves are represented pictorally in FIGS. 7p and 8p. The operation of solenoid operated valves is described in the Description of the Preferred Embodiment. FIGS. 7p and 8p illustrate the construction of currently accepted designs of armatures for solenoid controlled valves. Armature 55 consists of a solid cylindrical, magnetically responsive body 56 and a seal component 57. FIG. 7p illustrates a typical armature in which the seal component is a snap-on rubber seal, while FIG. 8p illustrates a typical armature in which the seal component is a recessed rubber seal.

Representative examples of variations and types of solenoid operated valves are disclosed by the following patent references:

| Patent No. | Patentee |
|---|---|
| 4,558,844 | Donahue |
| 4,387,878 | Zukausky |
| 4,174,824 | Kolze |
| 4,178,573 | Swanson |
| 4,175,590 | Grandclement |
| 3,872,878 | Kozel et. al. |
| 3,784,154 | Ostrowski et. al. |

The relevance of the above identified patents is limited to their disclosure of the environment in which the armature claimed herein will operate. Typical armatures used in the above disclosed patents are described hereafter.

One problem with currently accepted armatures which is apparent from FIGS. 7p and 8p is that expensive, close tolerance machining of expensive magnetic stainless steel is required in order to attach the seal component 57 securely to the magnetically responsive body 56. In order to maintain this close tolerance of machining, free machining magnetic stainless steels must be used in the magnetically responsive body 56. Free machining magnetic stainless steels are inherently less corrosion resistant than non-free machining magnetic stainless steels.

An additional problem with the armature illustrated in FIG. 8p is that a curling or staking operation is required in order to prevent the rubber seal from twisting during high pressure operation. Thus, should there be a failure of the connection of the seal component 57 to the body 56 in FIG. 8p, the seal component will become dislodged or twisted and therefore the sealing capability of the valve would be eliminated, leading to catastrophic flood and possible damage or personal injury.

As also illustrated in FIGS. 7p and 8p there is a spring guide member 58 located on the opposite end of armature 55 from seal component 57. Spring guide member 58 is also formed by machining the expensive magnetic stainless steel armature body. Since spring guide member 58 is formed of stainless steel, it should be apparent that spring guide member 58 could not sealingly engage a valve seat, thus requiring orientation of the armature during assembly of the solenoid operated valve. Critical assembly orientation greatly reduces the possibility of use of automated assembly methods for assembling the valves. This required orientation in assembly is an additional problem with currently accepted designs of armatures.

The presence of a metallic spring guide member on the opposite end of the armature from seal component 57 also increases the possibility of sharp impact between the metallic spring guide member 58 and the plastic closed end 48 (FIG. 1) of the guide tube when the solenoid is activated to move the armature 55 upwardly in the guide bore 11. This sharp impact between the metallic spring guide member 58 and the plastic closed end 48 of the guide tube may cause fracturing or knocking out of the guide tube. To reduce this effect, the guide tube must be extra long to provide a high degree of over travel for the current armature during operation. This is undesirable, since extra material must be used in the fabrication of the guide tube, and because even this does not completely solve the problem. Often a spring must be inserted in the guide tube to prevent plastic to metal impact.

Referring now more particularly to FIG. 8p, it should be apparent that there are other problems inherent in the recessed seal component design beyond merely the requirement of a critical curling (staking) operation to secure the seal component 57 in the magnetically responsive body 56. The recess seal component design requires critical alignment of the armature and valve seat during assembly. The recessed area for the rubber seal is surrounded circumferentially by the stainless steel body, thereby providing for a contact point between the soft plastic seat 30 and the stainless steel body during assembly of the valve. This results in a high probability of damage to the soft plastic seat by the armature which may affect the sealing capability of the valve. Thus, a critical alignment tolerance between the soft plastic seat and the recessed rubber seal must be maintained to prevent contact between the stainless steel armature recess curled diameter and the soft plastic seat. Not only must close tolerances be maintained in the curling operation of the armature but also the seat diameter is limited by the inside diameter of the curled portion of the armature body.

From the preceding it should be apparent that the inherent problems with the current designs of armatures for solenoid operated valves include:

(1.) Expensive close tolerance machining of expensive magnetic stainless steel is required;

(2.) Free machining magnetic stainless steels are inherently less corrosive resistant than non-free machining magnetic stainless steels;

(3.) A critical assembly operation (curling, staking) to prevent the rubber seal from pulling out or twisting during high pressure operation is required;

(4.) Orientation of the armature during assembly into the valve which complicates automated assembly procedures is required;

(5.) Since the armature body is of solid stainless steel and thus is relatively heavy, expensive solenoid coils must be used to overcome the gravitational force on the armature;

(6.) The possibility of damage to the soft plastic valve seats due to contact with the stainless steel armature is present;

(7.) Extra long guide tubes requiring extra material and springs are often required to prevent fracture and knocking out of the guide tube end by impact of the metallic end of the armature;

(8.) Critical alignment tolerances of the rubber seal to the soft plastic seat, and limitation of the seat diameter of the valve, must be maintained; and, (9.) Because of the requirement of such close alignment between the valve seat and the seal, very little space for clearance of dirt or contaminated water between the armature and the bore of the guide tube is allowed with the recessed seal design.

Although the previous armature designs with a snap-on tip similar to that illustrated in FIG. 7p, overcome some of the problems with other previous armature designs, e.g. no critical assembly operation as described in ¶ 3 above is required and the critical alignment problem discussed in ¶ 8 above is overcome, the snap-on tip design has several inherent deficiencies which are overcome by the present invention. Among the deficiencies in snap-on tip armature designs which are overcome by the present invention are:

(1) During high pressure operation the snap-on tip in FIG. 7p may be pulled off while the seal in the present invention will remain in place: and, (2) Even during low pressure operation, the rubber elastomer material used for the rubber tip in FIG. 7p can swell and degrade with use and therefore pull off, whereas the seal component in the present invention, if it does swell, will in fact become more firmly affixed within the armature body.

All of these disadvantages of currently accepted designs for armatures increase the costs of manufacturing, or reduce the efficiency of solenoid controlled valves. All of these problems are overcome by the preferred embodiment of the disclosed improved armature for solenoid operated valves.

SUMMARY OF THE INVENTION

Briefly describing one aspect of the improved armature of the present invention, there is provided a magnetically responsive, tubular housing with a central aperture extending longitudinally therethrough, within which is secured an elongated seal component wherein at least one end of the elongated seal component is disposed relative to one end of the magnetically responsive housing so that the seal component is sealingly engageable with a valve seat. In another aspect, the armature includes either or both ends of the seal component extending externally beyond the ends of the tubular housing. In a further aspect the seal component may include a disc-shaped portion on one or both ends, the disc-shaped portion having an outside diameter greater than the inside diameter of the tubular housing.

It should be apparent that the following are objects and advantages of the present invention:

(1) Realizing savings of expensive corrosion resistant magnetic materials;

(2) Providing for more reliable assembly of the magnetic stainless steel armature with the rubber seal;

(3) Eliminating the requirement of expensive close tolerance machining of expensive magnetic stainless steels and armatures with solenoid operated valves;

(4) Allowing for the construction of armatures for solenoid operated valves which use non-free machining magnetic stainless steel, which steel is inherently more corrosion resistant than free machining magnetic stainless steel;

(5) Eliminating the need for a critical assembly (curling, staking) operation to prevent the rubber seal from pulling out or twisting during high pressure operation;

(6) Reducing solenoid cost for solenoid operated valves by improving the magnetic characteristics of the armature;

(7) Eliminating possible damage to soft body valve seats due to contact with stainless steel armatures;

(8) Reducing the need for critical alignment tolerances of the seal component to the valve seat, thereby allowing for greater dirt contaminant clearance between the armature and the bore guide, and for greater valve seat diameters.

The prefferred embodiment additionally provides the following objects and advantages:

(1) Eliminating the need to orient the armature during assembly into the valve;

(2) Preventing impact of a solid armature to the end of the guide tube, by providing a rubber shock absorbing end on the armature, thereby eliminating the need for extra long tubes and springs; and, Further objects and advantages of the present invention will become apparent from the description of the preferred embodiment which follows.

DESCRIPTION OF THE PREFERRED EMBODIMENT

Figure 1:
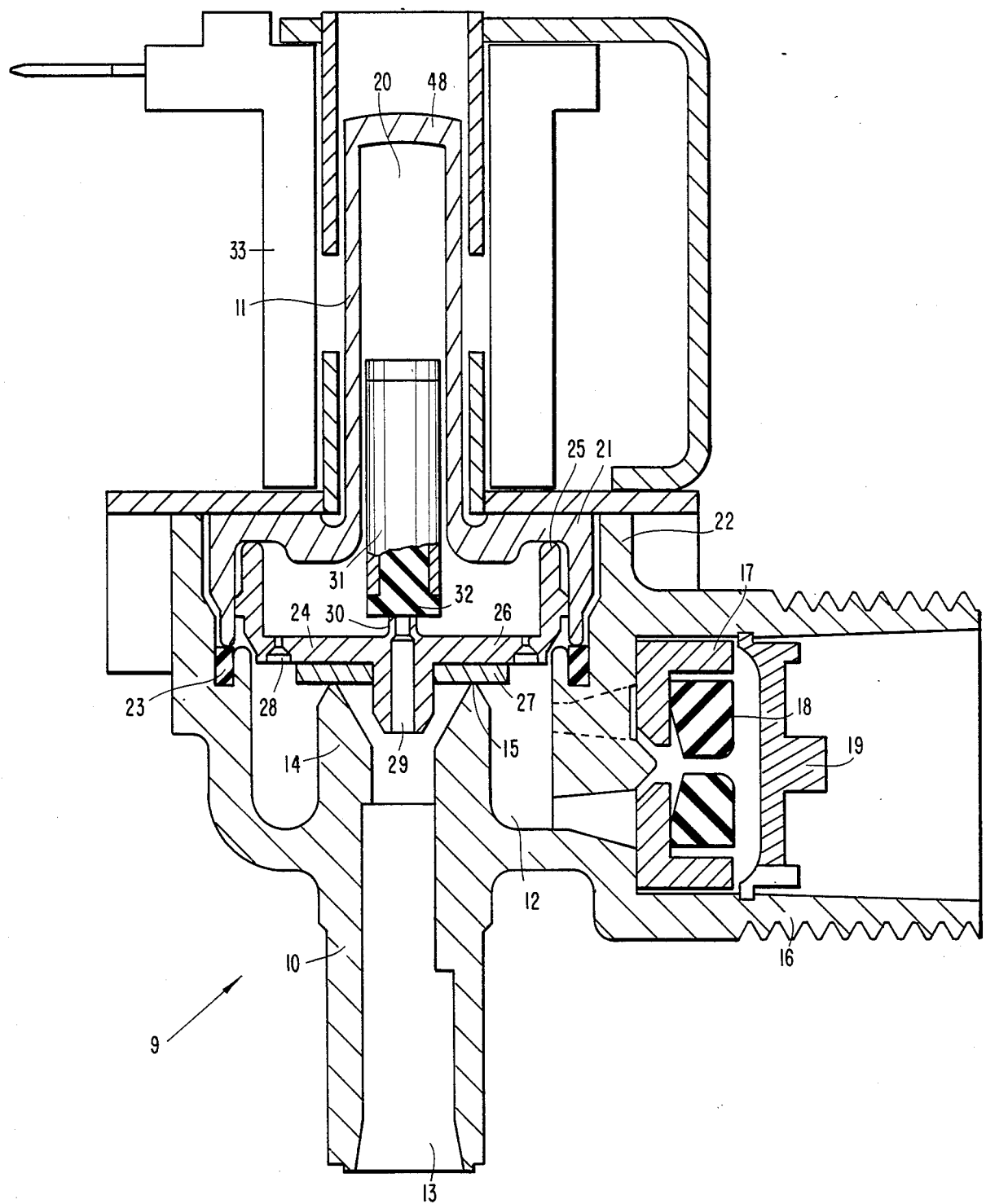
FIG. 1 is a cross-sectional view of a solenoid operated valve in which an improved armature according to the present invention is inserted.

For the purposes of promoting an understanding of the principles of the invention reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1 there is shown a cross-sectional view of a typical, direct operating valve assembly 9 including the preferred embodiment of an armature 31 constructed in accordance with the present invention. The assembly includes a valve body 10 and a guide tube 11. The valve body includes an annular inlet 12 and a central outlet 13 relative thereto. An annular portion 14 has an annular surface 15 located between the inlet and the outlet and provides a sealing surface as further described hereafter. A coupling portion 16 provides an inlet port in communication with the annular inlet. Mounted within the coupling portion is an insert 17, a flow control 18 and a retainer 19. An inlet screen (not shown) is typically installed upstream of the retainer 19 within the coupling portion.

The guide tube 11 is secured to the valve body 10 and includes a cylindrical guide portion 20 aligned with the outlet of the valve body. In the preferred embodiment as shown, the guide tube includes a cup-shaped portion 21 facing in the direction of the valve body and the valve body includes a complementarily shaped and facing cup-shaped portion 22. The outer surface of the cup-shaped portion 21 of the guide tube 11 is received adjacent the inner surface of the cup-shaped portion 22 of the valve body 10. An annular seal 23 is provided to seal the connection of the guide tube with the valve body.

An insert 24 is received within the valve assembly and is secured with either of the valve body or the guide tube. It is preferred that the insert be secured to the guide tube since this permits a more reliable alignment of the upraised valve seat 30 of the insert 24 with the guide tube 11, which is important to alignment of particular components of these two members. As shown, the insert 24 preferably includes a cup-shaped portion 25 facing in the direction of the guide tube and the outer surface of the cup-shaped portion 25 is received adjacent and aligns the insert with the inner surface of the cup-shaped portion 21 of the guide tube.

The insert 24 includes a disc-shaped portion 26 which includes an annular surface positioned adjacent a annular seal 27 positioned in turn adjacent the annular surface 15 of the valve body. The components of the guide tube, insert and valve body are sized and positioned such that securement of the guide tube with the valve body forces the insert against the seal 27 to provide a fluid tight seal between the insert and the annular surface 15.

The insert 24 includes several filtering inlet apertures 28 to permit flow of fluid from one side of the insert to the other side. The annular seal 27 is preferably of a lesser diameter than the disc-shaped portion of the insert. The inlet apertures 28 are then provided in a spaced relation in the area of the disc-shaped portion of the insert radially outward of the annular seal 27.

The insert includes a central aperture 29 which is aligned with and communicates with the outlet 13 of the valve body. An upraised valve seat 30 extends about the central aperture 29. The inlet apertures 28 are preferably smaller in diameter than the diameter of the central aperture 29 in order to provide the desired filtering effect.

An armature 31 is received within the guide cylinder of the guide tube. The armature 31 carries a seal component 32 which is positionable against the valve seat 30 of the insert. The armature 31 has a first position with the seal component 32 displaced from the valve seat, permitting fluid to flow from the annular inlet 12 through the inlet apertures 28 and then through the central aperture 29 and to and through the outlet 13 of the valve body. The armature 31 also has a second position, shown in FIG. 1, in which the seal component 32 is positioned in sealing relationship against the valve seat 30, and flow of fluid through the valve is precluded.

The assembly also includes means for moving the armature 31 between the first and second positions. This means may assume a variety of conventional types, and typically includes a solenoid valve action. As shown, a solenoid coil 33 is located about the armature 31 and is operable to move the armature 31 in the direction of the second position of the armature 31. In operation, the valve has a normally closed condition, but upon energization of the solenoid the armature 31 is moved into the first, open position, usually against the biasing force of a spring (not shown).

While the previous description of the environment of the disclosed invention was limited to use in a direct acting valve assembly, it should be understood that the disclosed armature is intended to be used in many different types of solenoid operated valves. For example, the improved armature disclosed herein may be used in a pilot operated valve.

Figure 2:
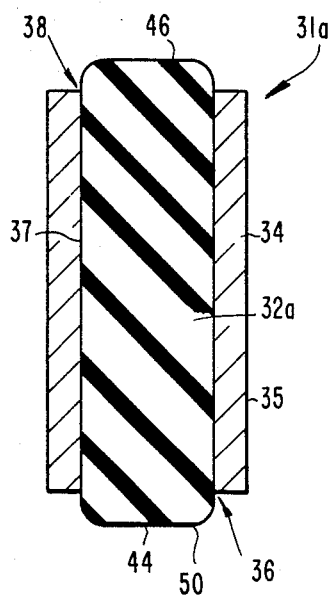
FIG. 2 is a cross-sectional view of an improved armature of the present invention.
Figure 5:
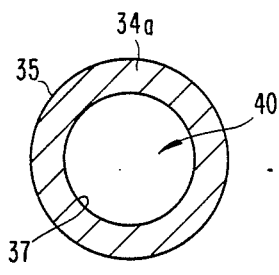
FIG. 5 is a cross-sectional plan view of an embodiment of a housing useful with the present invention, and particularly showing the use of a seamless, tubular housing.
Figure 6:
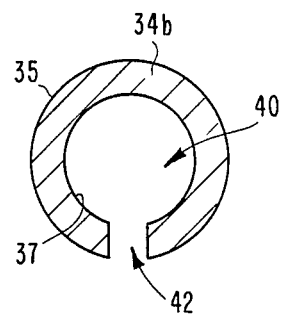
FIG. 6 is a cross-sectional plan view of an embodiment of a housing useful with the present invention, and particularly showing the use of a split-seam, tubular housing.
Figure 7P:
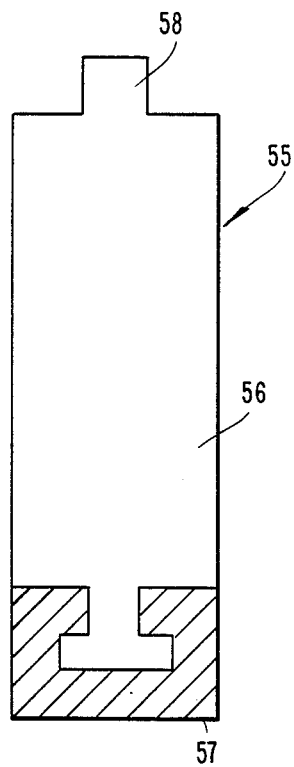
FIG. 7p is a cross-sectional view of a snap fit armature of the type currently accepted in the field of solenoid operated valves.
Figure 8P:
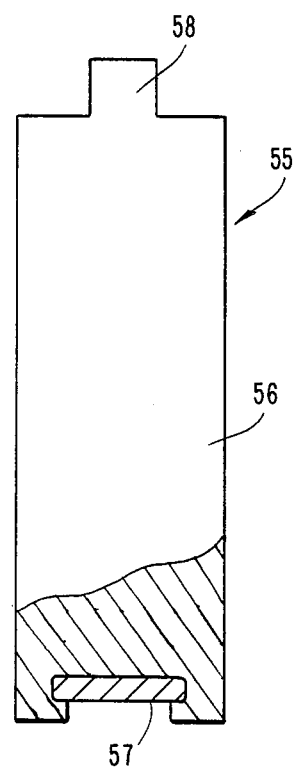
FIG. 8p is a cross-sectional view of a recessed seal type armature currently accepted in the field of solenoid operated valves.

Referring now more particularly to FIGS. 2, 5 and 6, there is illustrated a first embodiment of an armature 31a for a solenoid operated valve. Armature 31a has a magnetically responsive tubular housing 34, which has an exterior surface 35, an interior surface 37, a first open end 36 and a second open end 38. Interior surface 37, first open end 36 and second open end 38 define a longitudinally extending central aperture 40.

It is envisioned that the magnetically responsive, tubular housing may be constructed of any magnetically responsive material which demonstrates sufficient magnetic responsiveness for operation of a solenoid valve and also demonstrates sufficient corrosion resistance for the operation of a solenoid valve. A particularly suitable material for the construction of the magnetically responsive tubular housing is magnetic stainless steel. Non-free machining stainless steel, i.e. magnetic stainless steel without added sulfur, is preferred in the fabrication of the housing 34 to minimize corrosion of the material during operation of the valve.

Housing 34 may be formed in various manners. Readily available and readily inexpensive stock material may be used. One variation is shown in FIG. 5 in which the housing has a seamless construction 34a. Alternatively, the housing may have a split-seam construction 34b in which there is included a longitudinally extending gap 42.

It should be apparent from the description of the improved armatures of the present invention that many of the problems inherent in prior designs for solenoid operated valves are overcome. Since the improved armature incorporates a magnetically responsive tubular body, much of the expense in manufacturing of armatures and valves is avoided. Expensive close tolerance machining of expensive magnetic stainless steels is eliminated. Seamless construction 34a of magnetically responsive tubular housing 34 may be obtained through the use of prefabricated seamless magnetic tubing. The length of the tube is established by simple low cost cut off machining that does not require close tolerances. This simple cut off operation results in much faster part fabrication as well as the elimination of the need for free machining of the magnetic material. The seamless construction may also be obtained by drawing the tube in high speed, low cost metal stamping and drawing equipment. Split seam construction 34b of magnetically responsive tubular housing 34 requires no machining at all. This part may be fabricated on high speed, low cost metal stamping equipment. Also, significant savings may be realized for both seamless and split-seam armature bodies by material savings. The material required for fabrication of both improved armatures may be 25% to 70% less than that required for previous designs.

Since little or no machining is required for the improved armatures, non-free machining materials may be utilized. These materials have a lower base cost and have inherently better corrosion resistance than the free machining materials used in the fabrication of both currently accepted designs. To obtain the free machining characteristics, the steel mills add sulfur to the base material. During the valve operation, the sulfur leeches out of the material reacting with the medium (water) and resulting in a corrosive attack to the base material. Therefore, the elimination or reduction of the sulfur addition is preferred for improved valve performance and extended valve life.

The use of a magnetically responsive tubular housing 34 in armature 31, rather than a solid cylindrical magnetically responsive armature body, also may lead to cost savings in solenoid construction. The use of a tubular housing reduces the weight of the armature by eliminating a core of magnetically responsive material from the armature. Rather than a dense steel core, armature 31 has a core of less dense rubber or thermoplastic. Since significant magnetic attraction occurs at the outer radial surfaces of any cylindrical armature, the magnetic inefficiencies imposed by the core of the armature are removed by the elimination of the core material, thereby improving definition of the magnetic flux path resulting in improved operating forces. Due to the improved operating forces, a weaker magnetic field than is currently required in a solenoid operated valve is required when this improved armature is used. Since the improved armature has more efficient magnetic properties, greater diametric clearances between the guide tube bore and the armature may be realized. With greater clearances, the solenoid becomes much less sensitive to dirt or contaminants that might impede the operation or movement of the armature during valve operation. Since the solenoid needs to generate less of a magnetic field with this improved armature, it is possible to eliminate some of the windings of the solenoid, and/or increase the magnet wire diameters which are more easily fabricated and assembled in the solenoid resulting in additional cost savings in construction of valves.

A seal component 32a is secured within magnetically responsive tubular housing 34. Seal component 32a has a valve seat engaging end 44 located proximately to the first open end 36 of magnetically responsive tubular housing 34. Valve seat engaging end 44 is designed to be sealingly engageable with a valve seat 30 (FIG. 1). The seal component 32a also has an opposite end 46 located proximately to second open end 38 of magnetically responsive, tubular housing 34. Opposite end 46 operates as a shock absorbing mean to prevent possible damage which could be caused by impact of the armature 30 with closed end 48 of the guide tube (FIG. 1).

Valve seat engaging end 44 extends externally beyond first open end 36 of tubular housing 34 and opposite end 46 extends externally beyond second open end 38 of tubular housing 34. Valve seat engaging end 44 has been referred to as being sealingly engageable with the valve seat and opposite end 46 has been referred to as a shock absorbinq means. However, it should be understood that a feature of the armature 31a is that it is reversible, such that end 46 could act as a valve seat engaging means and end 44 could act as a shock absorbing means. This feature of armature 31 eliminates the need for critical orientation of the armature during assembly of the solenoid operated valve and thus facilitates automated assembly.

Seal component 32a also has an exterior surface 50. Exterior surface 50 is secured to interior surface 34 of housing 34. Any cross section that allows for sufficient securing of seal component 32a within tubular housing 34 may be used. However, in this embodiment the seal component is generally cylindrical. The sealing component 32a may be secured within tubular housing 34 by non-critical staking, insert molding, frictional fit, or heat staking forming. The seal component 32a may be made of any suitable material which would allow for a sealing engagement with a valve seat. The preferred material is either rubber or thermoplastic rubber.

It should be appreciated that should seal component 32a become dislodged from tubular housing 34 during operation, tubular housing 34 would guide the seal component 32a into contact with valve seat 30 and thus prevent a catastrophic flood and possible damage. It should also be appreciated that extension of valve seat engaging end 44 beyond first open end 36 of tubular housing 34 reduces the need for critical alignment of armature 31a within guide bore 11. This reduction of need for critical alignment of the armature 31 within the guide bore 11 allows for greater dirt contaminant clearance between the armature and the bore of the guide tube.

With the rubber seal 32a not being surrounded circumferentially by a stainless steel body, there is no contact between stainless steel and the soft plastic valve seat. The contact point would be between the soft plastic seat and soft armature seal component, resulting in elimination of damage to the plastic seat during assembly.

The improved armature also provides for a soft cushion should the armature seal contact the guide tube end. This helps to eliminate possible damage or fracture to the guide tube. This latter feature is accomplished by the extension from the metallic body of the soft rubber or thermoplastic. Thus, the improved armature eliminates the requirement of an extra long guide tube to permit over-travel or of a protective spring, by providing a soft rubber cushion contact.

Figure 3:
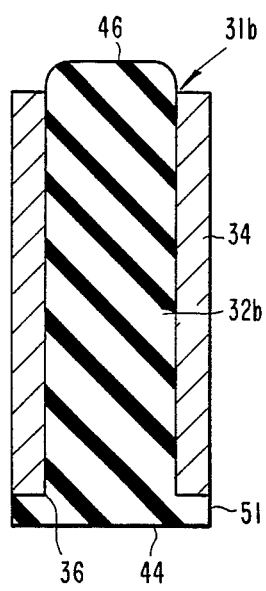
FIG. 3 is a cross-sectional view of a second embodiment of an improved armature.

Referring now more particularly to FIGS. 3, 5 and 6, a second embodiment 31b of an improved armature is disclosed. Armature 31b comprises a magnetically responsive tubular housing 34 the same as that which has been previously described with respect to armature 31a. Armature 31b also has a seal component 32b having a valve seat engaging end 44 extending beyond first open end 36 of tubular housing 34. Armature 31b further includes a disc-shaped portion 51 with an outside diameter greater than the inside diameter of magnetically responsive tubular housing 34. Disc-shaped portion 51 is designed to be sealingly engageable with a valve seat. Seal component 32b also has an opposite end 46 extending beyond the second open end 38 of magnetically responsive tubular housing 34. While the preferred orientation of armature 31b would place valve seat engaging end 44 with its disc-shaped portion 51 in sealing engagement with valve seat 30 (FIG. 1), it should be understood that the armature is reversible and end 44 and disc-shaped portion 51 may act as a shock absorbing means and end 46 may act as a valve seat sealing means so that orientation of armature 31b is not critical. The remainder of the description of sealing component 32a applies equally as well to sealing component 32b.

Figure 4:
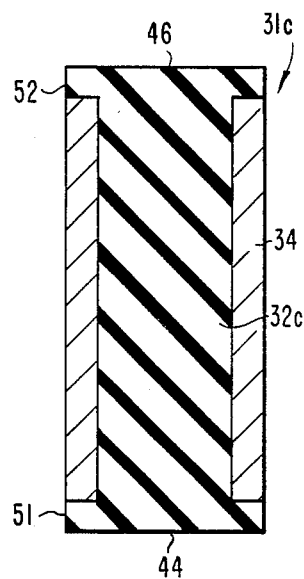
FIG. 4 is a cross-sectional view of a third embodiment of an improved armature.

Referring now to FIGS. 4, 5 and 6, there is illustrated a third and preferred embodiment of an armature 31c for use in a solenoid operated valve. Armature 31c includes a magnetically responsive tubular housing 34 the same as that described with respect to armature 31a. Armature 31c has a seal component 32c which has a valve seat engaging end 44 extending beyond open end 36 of magnetically responsive tubular housing 34. Valve seat engaging end 44 has a disc-shaped portion 51 which has an outside diameter greater than the inside diameter of magnetically responsive tubular housing 34. Valve seat engaging end 44 and disc-shaped portion 51 are designed to sealingly engage a valve seat 30 (FIG. 1). Opposite end 46 has a second disc-shaped portion 52 with an outside diameter greater than the inside diameter of magnetically responsive tubular housing 34. Opposite end 46 and second disc-shaped portion 52 are designed to act as a shock absorbing means between armature 31c and closed end 48 of the guide tube (FIG. 1). While valve seat engaging end 44 and first disc-shaped portion 51 are referred to as a valve seat sealing means, they could operate equally as well as a shock absorbing means. While opposite end 46 and second disc-shaped portion 52 are referred to as a shock absorbing means, they are designed to operate equally as well as a valve seat sealing means. Thus, it should be apparent that the armature is reversible and that orientation of armature 31c in assembly of a solenoid operated valve is not critical. The remainder of the description of armature 31a applies equally as well to armature 31c.

An armature according to the teachings of the present invention may alternatively consist of a seal component 32 having a valve seat engaging end 44 being located proximal to, but not extending externally beyond, first open end 36 of tubular housing 34. The end could, for example, be positioned at the location of the dotted line in FIG. 2. Also, opposite end 46 could be located proximal to, but not extending beyond, second open end 38 of tubular housing 34. While such a design would not provide all of the advantages of the other designs disclosed herein, it would still lead to significant savings in machining costs and materials cost for magnetically responsive armatures, as well as provide other advantages. Thus, while such an armature would be within the teachings of this application and is claimed by this application, such an armature is not a preferred embodiment of this application.

Additionally an armature with a central aperture extending substantially through the tubular housing and a single closed end would have many of the advantages of the preferred embodiment although it would lack the assembly orientation and guide tube knock-out advantages.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An armature for opening and closing an aperture in a valve seat in a solenoid operated valve, said armature comprising:
   a magnetically responsive tubular housing defining a central aperture extending longitudinally through said housing from a first open end to a second open end, said housing having a split seam construction; and
   a seal component secured within said central aperture of said housing, said seal component having a first end defining a surface sealingly engagable with a valve seat and an opposite end which extends externally beyond the second open end of said tubular housing.

2. The armature of claim 1 wherein the valve seat engaging end extends externally beyond the first open end of said tubular housing.

3. The armature of claim 1 wherein said seal component extends completely through the central aperture of said housing, the valve seat engaging end extending externally beyond the first open end of said tubular housing.

4. The armature of claim 3 wherein the interior surface of said tubular housing contiguously engages the exterior surface of said seal component.

5. The armature of claim 3 wherein said seal component is generally cylindrical.

6. The armature of claim 5 wherein the valve seat engaging end further comprises a disc-shaped portion defining the sealing surface and having an outside diameter greater than the inside diameter of said tubular housing.

7. The armature of claim 6 wherein the disc-shaped portion is integral with the seal component at the valve seat engaging end of said seal component.

8. The armature of claim 1 wherein the valve seat engaging end further comprises a first disc-shaped portion defining the sealing surface and having an outside diameter greater than the inside diameter of said tubular housing and the opposite end further comprises a second disc-shaped portion defining a shock absorbing surface and having a outside diameter greater than the inside diameter of said tubular housing.

9. The armature of claim 8 wherein the first disc-shaped portion is integral with the seal component at the valve seat engaging end of said seal component and the second disc-shaped portion is integral with the seal component at the opposite end of said seal component.

10. An armature for opening and closing an aperture in a valve seat in a solenoid operated valve, comprising:
    a magnetically responsive, tubular housing having an exterior surface, a single interior surface, a first open end and a second open end, said single interior surface first open end and a second open end defining a single cylindrical central aperture extending longitudinally through said housing from said first open end to said second open end said tubular housing having a split-seam construction; and,
    an elongated, generally cylindrical seal component secured within the central aperture of said tubular housing, said seal component having a valve seat engaging end, an opposite end and an exterior surface the valve seat engaging end defining a surface sealingly engageable with a valve seat, said seal component extending completely through the central aperture of said housing, the valve seat engaging end extending externally beyond the first open end of said tubular housing, the opposite end of said seal component extending externally beyond the second open end of said tubular housing.

11. An armature for opening and closing an aperture in a valve seat in a solenoid operated valve, said armature comprising:
 a magnetically responsive tubular housing defining a central aperture extending longitudinally through said housing from a first open end to a second open end, said housing having a split seam construction; and
 a seal component secured within said central aperture of said housing, said seal component defining a surface sealingly engagable with a valve seat; and
 wherein said tubular housing has a uniform outer diameter, whereby said housing is reversible within the solenoid operated valve.

12. An armature for opening and closing an aperture in a valve seat in a solenoid valve, said armature comprising:
 a magnetically responsive tubular housing defining a central aperture extending longitudinally through said housing from a first open end to a second open end, said housing having a split seam construction; and
 a seal component secured within said central aperture of said housing, said seal component defining a surface sealingly engagable with a valve seat; and
 wherein said tubular housing has a longitudinal axis and a midpoint between the first and second open ends, said housing being symmetrical about a plane intersecting the midpoint of said housing normal to the longitudinal axis of said housing.

* * * * *